United States Patent
Piuzzi et al.

(10) Patent No.: US 9,209,613 B2
(45) Date of Patent: Dec. 8, 2015

(54) MOUNTING FOR HOLDING ELONGATE OBJECTS IN POSITION RELATIVE TO A STRUCTURE

(75) Inventors: Olivier Piuzzi, Tournefeuille (FR); Gerard Peyssi, Aussonne (FR); Francois Rouyre, Cornebarrieu (FR)

(73) Assignee: AIRBUS OPERATIONS S.A.S., Toulouse (FR)

( * ) Notice: Subject to any disclaimer, the term of this patent is extended or adjusted under 35 U.S.C. 154(b) by 595 days.

(21) Appl. No.: 13/508,556

(22) PCT Filed: Nov. 8, 2010

(86) PCT No.: PCT/FR2010/052398
§ 371 (c)(1),
(2), (4) Date: Jul. 27, 2012

(87) PCT Pub. No.: WO2011/055100
PCT Pub. Date: May 12, 2011

(65) Prior Publication Data
US 2012/0292461 A1    Nov. 22, 2012

(30) Foreign Application Priority Data
Nov. 9, 2009  (FR) ...................................... 09 57903

(51) Int. Cl.
*H02G 3/22*    (2006.01)
*H02G 3/36*    (2006.01)
(Continued)

(52) U.S. Cl.
CPC .. *H02G 3/22* (2013.01); *F16L 3/24* (2013.01); *H02G 3/30* (2013.01); *H02G 3/32* (2013.01); *H02G 3/36* (2013.01)

(58) Field of Classification Search
CPC ............. H02G 3/22; H02G 3/32; H02G 3/36; H02G 3/30; H02G 3/28; H02G 3/286; H02G 3/288; F16L 3/16; F16L 3/24
USPC .................. 248/74.1, 74.4, 65, 73, 71, 72
See application file for complete search history.

(56) References Cited

U.S. PATENT DOCUMENTS 3,454,247 A * 7/1969 Geisinger ........................ 248/56
4,265,005 A * 5/1981 Heckethorn ...................... 24/277
(Continued)

FOREIGN PATENT DOCUMENTS

DE          100 10 933        8/2001
DE       10 2005 039 652      3/2007
(Continued)

OTHER PUBLICATIONS

International Search Report Issued Feb. 17, 2012 in PCT/FR10/052398 Filed Nov. 8, 2010.

*Primary Examiner* — Nkeisha Smith
(74) *Attorney, Agent, or Firm* — Oblon, McClelland, Maier & Neustadt, L.L.P.

(57) ABSTRACT

The invention relates to a mounting (1) for holding an elongate object (13) such as an electric cable in position relative to a structure (12). According to the invention, said mounting comprises: two parts for connecting the mounting to the structure (2, 3, 21, 22) each of which has a bearing surface (2a, 3a, 21a, 22a) suitable for resting each side of the structure against a bearing surface (12a, 12b) of the structure, said two connecting parts being assembled together by a clamping means (7, 8, 10), at least one supporting part (4, 23, 24) suitable for maintaining said elongate object (13) via a holding means (50, 31, 37, 69), characterized in that said mounting part is provided in the form of a substantially cylindrical railing (23, 24), secured to a connecting part.

6 Claims, 11 Drawing Sheets

(51) Int. Cl.
  *H02G 3/30* (2006.01)
  *F16L 3/24* (2006.01)
  *H02G 3/32* (2006.01)

(56) References Cited

U.S. PATENT DOCUMENTS

| | | | |
|---|---|---|---|
| 5,537,714 A | 7/1996 | Lynch, Jr. et al. | |
| 5,624,089 A * | 4/1997 | Nadherny et al. | 248/62 |
| 2001/0019093 A1 | 9/2001 | Koziol | |
| 2003/0122040 A1 * | 7/2003 | Pisczak | 248/74.1 |
| 2008/0283687 A1 * | 11/2008 | McClure et al. | 248/74.1 |
| 2009/0072098 A1 | 3/2009 | Smallhorn | |

FOREIGN PATENT DOCUMENTS

| | | |
|---|---|---|
| EP | 0 700 139 | 3/1996 |
| EP | 2 037 552 | 3/2009 |
| FR | 1 578 347 | 8/1969 |
| WO | 2006 007326 | 1/2006 |

* cited by examiner

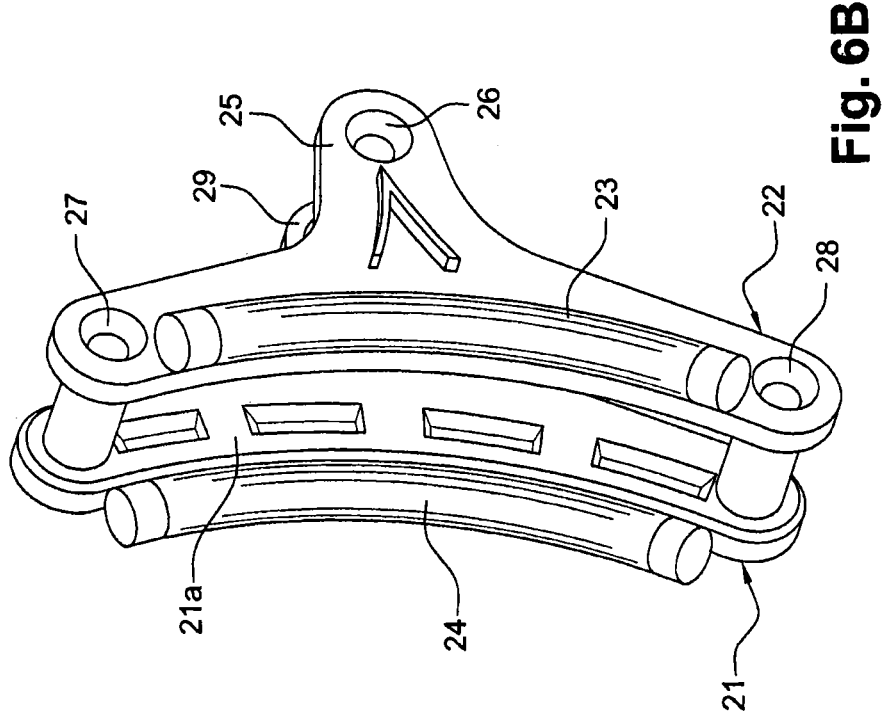
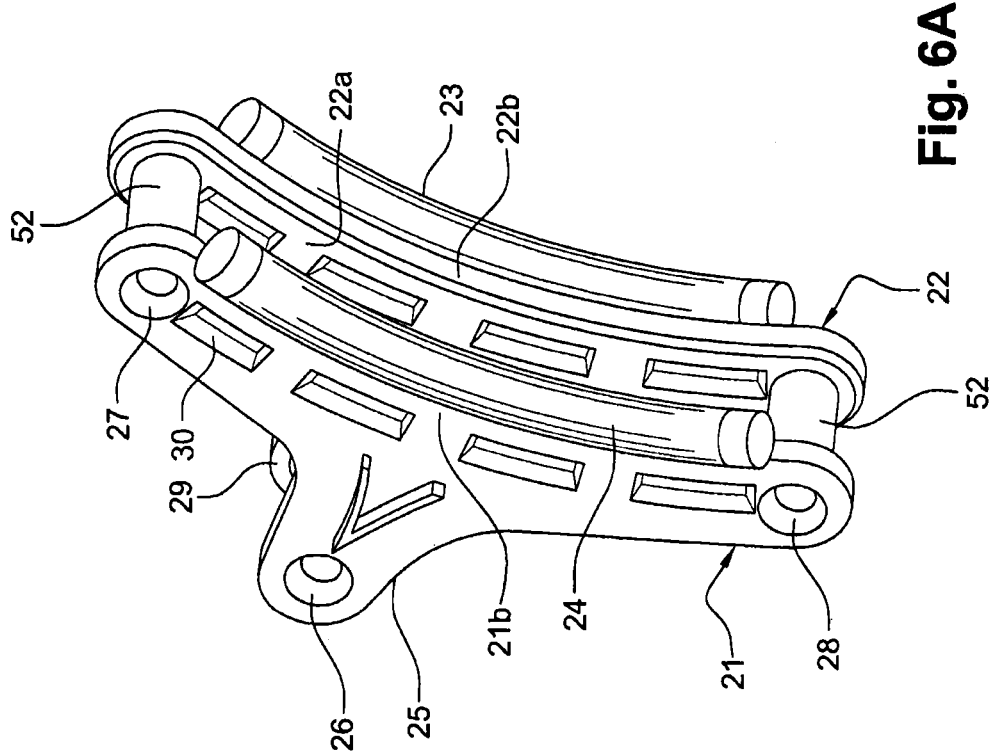

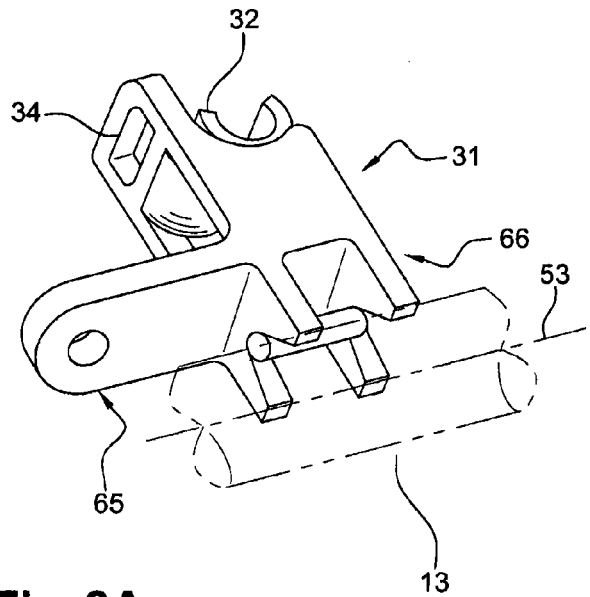
Fig. 8A
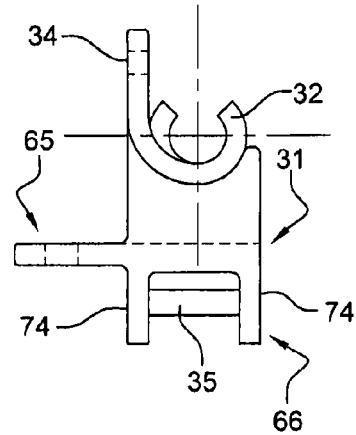
Fig. 8B
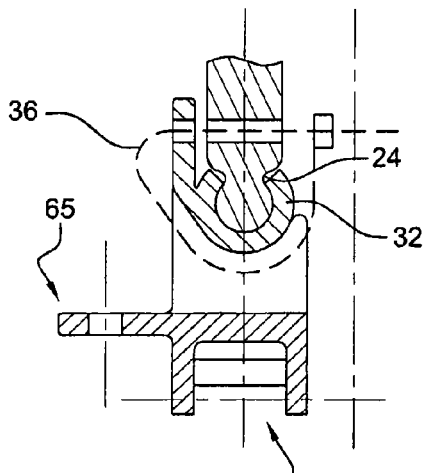
Fig. 8D
Fig. 8C

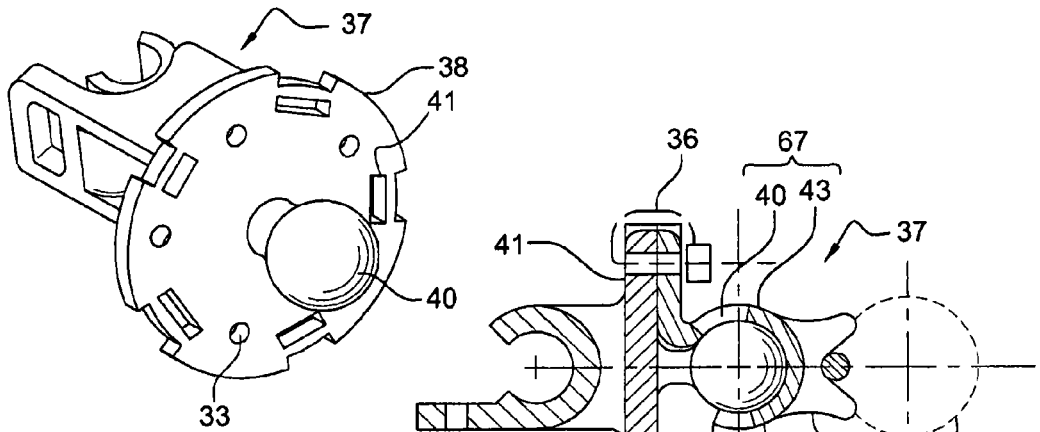
Fig. 9A
Fig. 9B
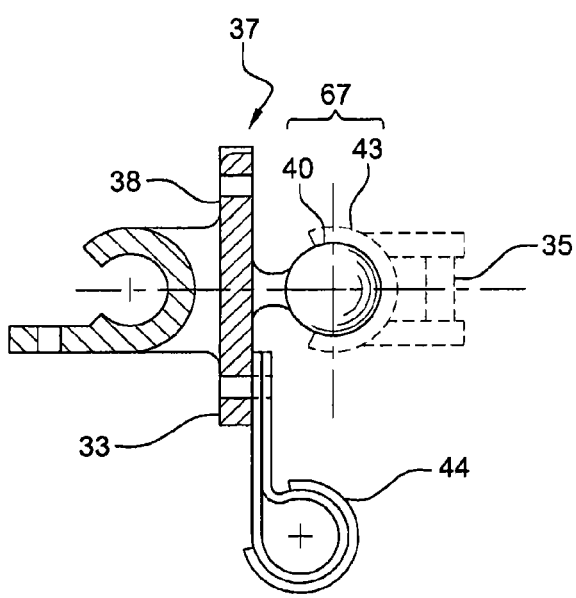
Fig. 9C
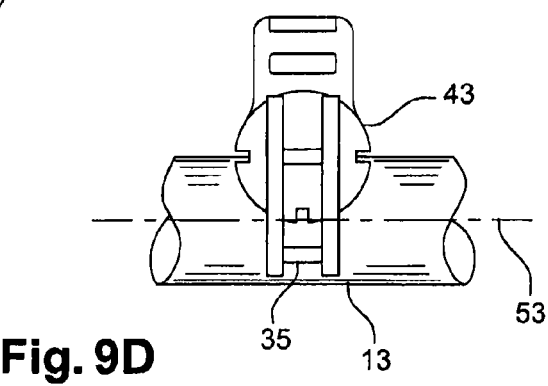
Fig. 9D

MOUNTING FOR HOLDING ELONGATE OBJECTS IN POSITION RELATIVE TO A STRUCTURE

The present invention pertains to a mounting for holding elongate objects such as tubes, sheaths, cables etc. in position relatively to a structure such as a cross-piece or a beam, said mounting comprising at least one supporting element to maintain said elongate objects oriented along a direction chosen by means of maintaining means and tie means such as a clamping collar.

On board aircraft, the electrical cable harnesses are generally held by holding elements, for example clamping collars, on mountings which are themselves fixed to structural elements such as fuselage frames or floor beams. These mountings which are generally sheets made of light alloy are riveted or screwed into the structure of the aircraft. Often, these mountings cannot be adapted to all structures.

Moreover, the mountings and the collars currently used are not at a sufficient distance to prevent said cables from rubbing against the beams or frames. Such frictional contacts, especially in a vibrating environment, can lead to wear and tear in the sheaths of the electrical cables and give rise to disturbances, such as signal losses or short-circuits, in the working of the electrical circuits connected to said cables.

When the position of the harnesses in space has to be perfectly controlled, there also exist known ways of using rigid mountings which follow the desired paths and are fixed to the structure at several points. Such mountings are heavier and more difficult to install.

The present invention proposes a novel mounting to hold in position a cable or a harness of electrical cables or any other elongate object, at least partially resolving at least one of the above problems.

In particular, the mounting according to the invention for holding at least one elongate object is simpler in its operating mode while at the same time ensuring that the elongate object is held more efficiently.

There is thus proposed a novel form of mountings that no longer requires the use of conventional fastening means but directly incorporates a function of clamping to the structure for simpler and more reliable mounting.

It is another goal of the invention to propose a mounting having greater modularity in terms of area of fastening on the structure and shape of the structure as compared with existing mountings.

To this end, the invention pertains to a mounting for holding an elongate object such as an electrical cable in position relatively to a structure.

According to the invention, said mounting comprises:
two parts for connecting the mounting to the structure, each of which has a bearing face to support each side of the structure against a bearing surface of the structure, said two connecting parts being assembled with each other by clamping means,
at least one supporting part capable of holding said elongate object by holding means,
said supporting part taking the form of a railing having a substantially cylindrical shape and being secured to a connecting part.

The substantially cylindrical railing has for example a circular, square or other section. Advantageously, the railing has a plane face designed to be facing a module capable of getting clipped on to said railing in order to hold said module immobile in rotation.

According to one embodiment of the invention, the bearing surfaces of the structure are substantially plane, at least one aperture being prepared in the structure to allow said elongate object to pass through.

The connecting parts are configured so as to at least partially clamp the rim of the aperture.

For example, each of the two parts takes the form of a half-cradle which at least partially grips the rim of the aperture, the two assembled half-cradles defining an orifice through which the elongate object is received. Thus, as the mounting is constituted by two half-cradles that define the orifice through which, for example, there pass electrical cables, the risk of friction by contact with these cables against the edge of the structure is practically eliminated.

According to one embodiment of the invention, one of the two connecting parts comprises at least one protruding element and the other part comprises at least one corresponding hollow, said protruding elements and said corresponding hollows working together to block said two parts against the bearing surfaces of the structure.

In this way, the clamping function is directly integrated into the mounting by means of these two connecting parts, thus preventing the use of conventional fastening means. The step of mounting these parts on the structure is made simpler than the prior-art mounting brackets.

According to an alternative form, the two connecting parts comprise holes enabling the passage of the clamping means such as clamping collars to block said two parts against the bearing surfaces of the structure.

Advantageously, in their bearing face, the two parts may comprise locking means to block the parts in position on the structure in order to give a better fastening of the mounting to the structure in a vibrating environment.

Said railing-shaped mounting has one end secured to at least one of the connecting parts.

To totally eliminate the risk of friction between the cables and the supporting part, the elongate object can be held at a distance relatively to the upper surface of the railing as well as the edge of the orifice in order to prevent friction which could cause wear and tear in the elongate object.

Preferably, said holding means form a substantially closed surface such as a clamping collar or ring designed to surround the external contour of the elongate objects.

According to another embodiment of the invention, the two connecting parts take the form of a pair of cheek plates, said cheek plates comprising one edge having a substantially incurvated shape and one edge prolonged by an extension. Holes are provided at the ends of the cheek plates and the extension to receive a clamping means to assemble the two cheek plates with each other against the structure.

According to one embodiment, the holding means take the form of a clip-on module comprising a first fastening lug configured so as to get clipped onto said railing and at least one second fastening lug designed to attach the elongate object by fastening means. Thus, it can be understood that it is very easy to mount and dismantle the module relative to the railing.

For example, the first fastening lug comprises a concave open surface capable of getting clipped onto the railing.

Preferably, for a better fastening of the module to the railing, holes are provided in said first end and in the cheek plates to enable the passage of an attachment means such as a clamping collar.

According to one particular advantageous form of the invention, said second fastening lug forms a ball-and-socket link to orient the elongate object in the chosen direction.

Preferably, this ball-and-socket link is constituted by a substantially circular part provided at its center with a protruding element having a spherical contact surface, said surface cooperating with a corresponding spherical concave surface of a mobile fastening element. Holes are provided on the periphery of said part and the mobile fastening element to cause the passage of an attachment means to fix the mobile element to the spherical surface once the direction in which the elongate object has to be held is chosen.

According to one embodiment of the invention, said second fastening lug forms a fastening part comprising at least one hole to receive the fastening means.

According to another embodiment of the invention, the mounting comprises an assembly of two intermediate supporting parts designed to be interposed between two fastening parts belonging to two distinct mountings, the two intermediate parts being mounted sliding relative to each other in order to adjust the length of said assembly.

Preferably, the assembly comprises a female railing having a substantially circular-sectioned cylindrical shape, the elongate object being held in position on said railing by fastening means.

According to one particular form of the structure in which at least one of said bearing surfaces of the structure forms two angled bearing surfaces, the cheek plate designed to come to bear against said angled bearing surfaces comprises two bearing surfaces connected to each other by a connecting arm, said arm being laid out so that said two bearing faces respectively bear against the two angled bearing surfaces. The invention shall be described in greater detail with reference to the appended drawings, of which:

FIG. 1 is a schematic representation, in an exploded view, of a mounting to hold the elongate elements in position in a first embodiment of the invention, the railing of said mounting not having been represented in order to provide a better view of the clamping means implemented;

FIGS. 2A, 2B schematically represent another embodiment of the clamping means implemented in the mounting according to the first embodiment, the railing being here too not represented;

FIGS. 6A and 6B show two views of a mounting according to a second embodiment;

FIGS. 8A, 8B, 8C and 8D show the different views of a first embodiment of a clip-on module;

Figure 10:
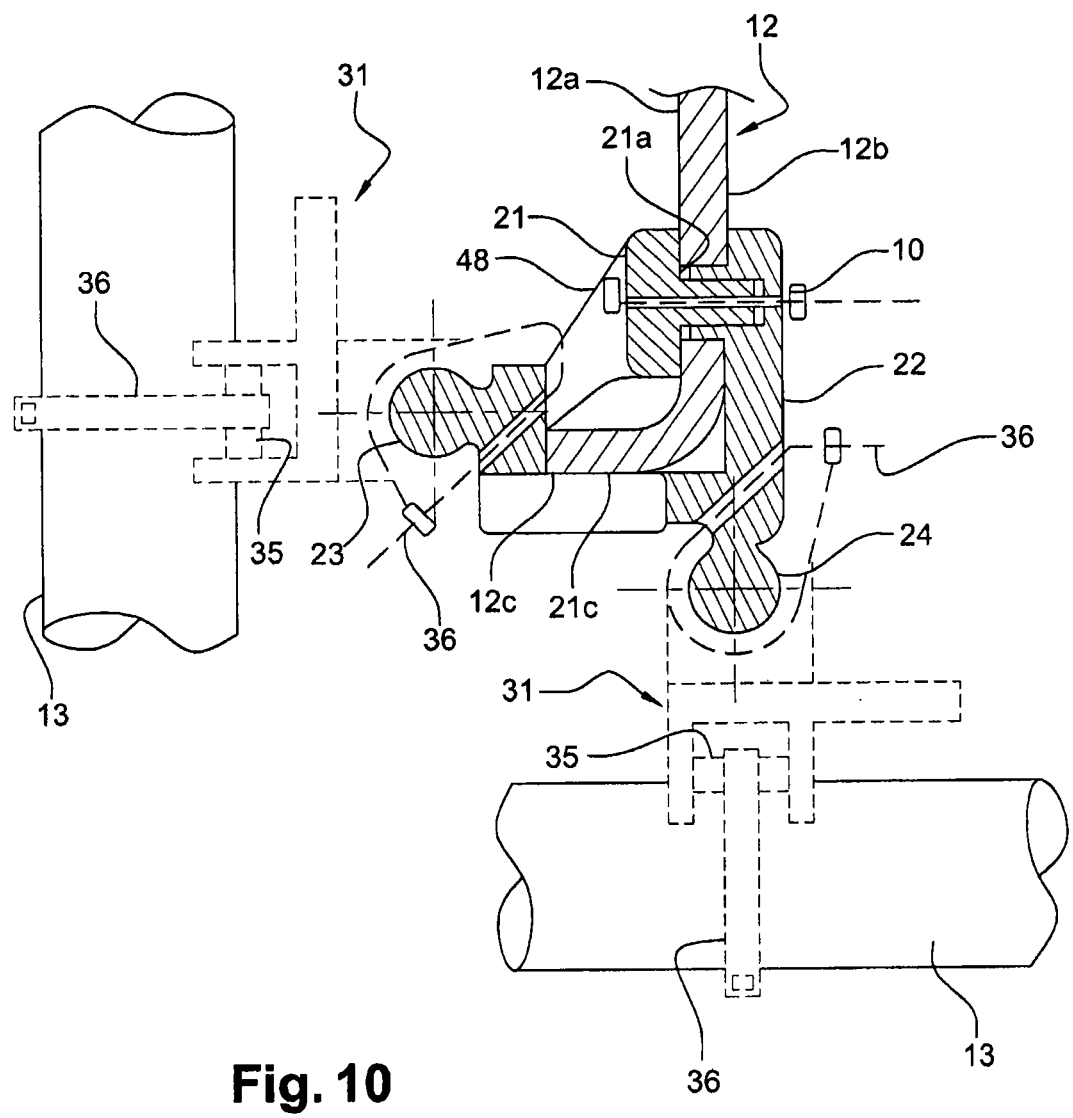
Figure 11:
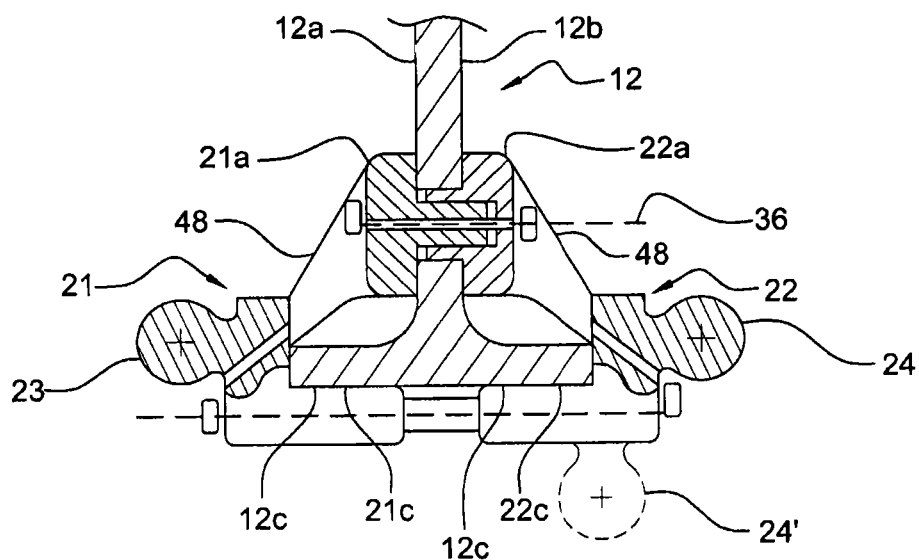
Figure 12:
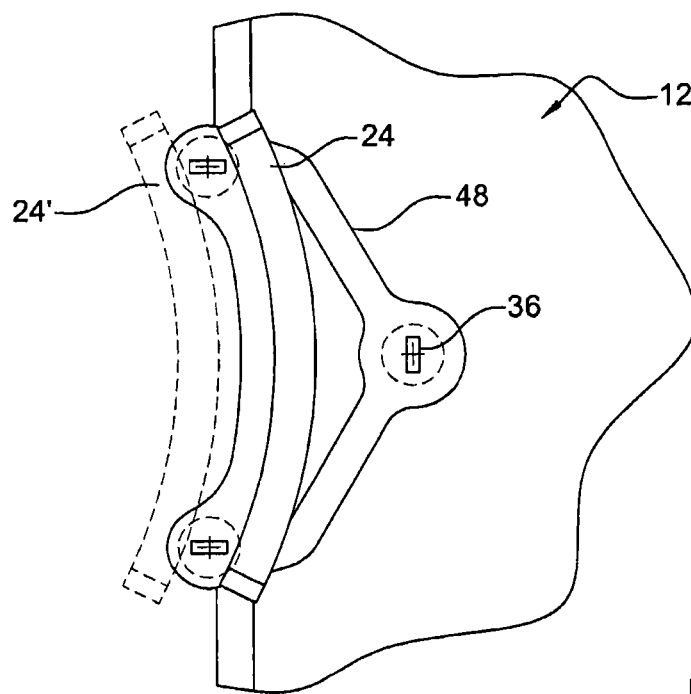
Figure 13:
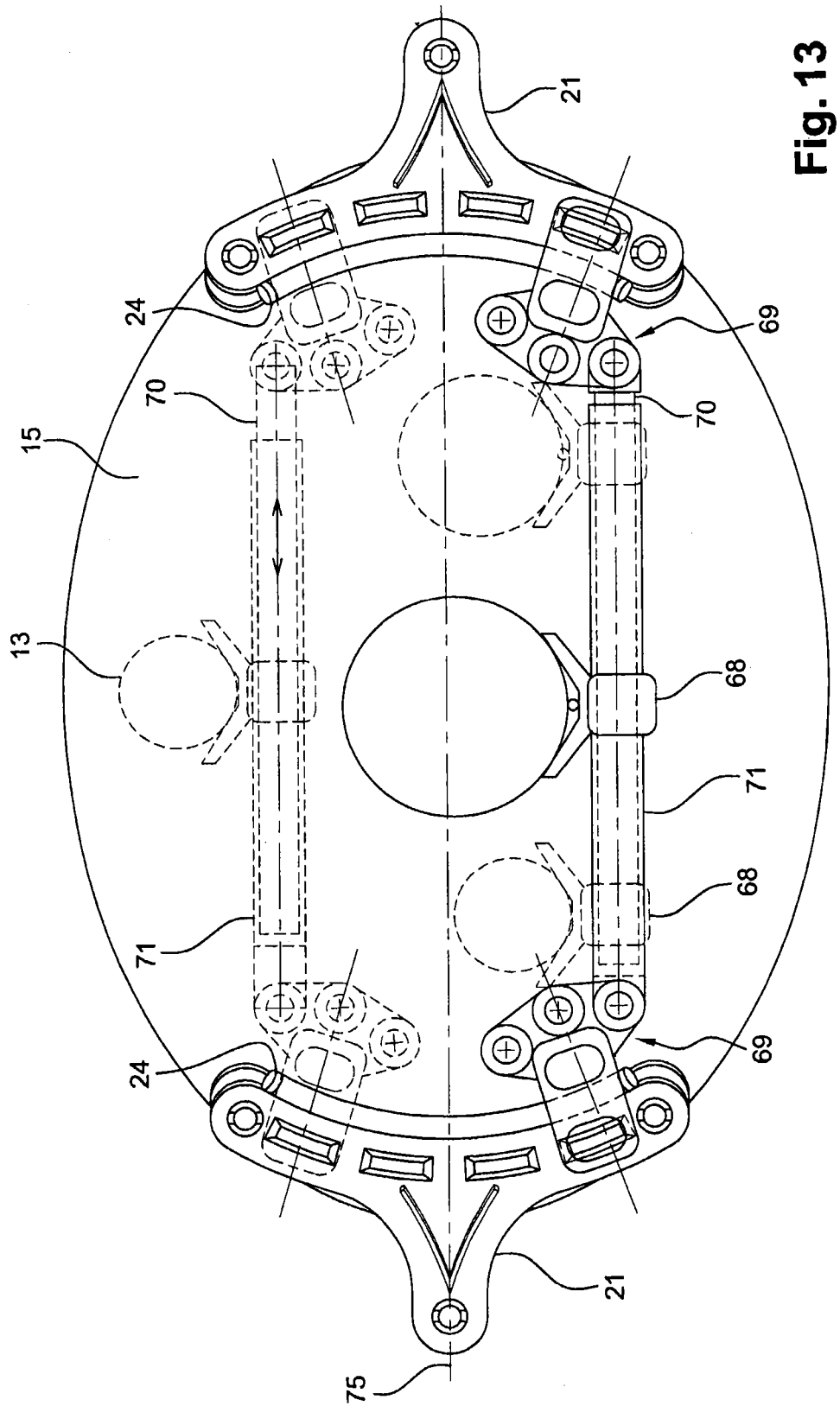
Figure 14A:
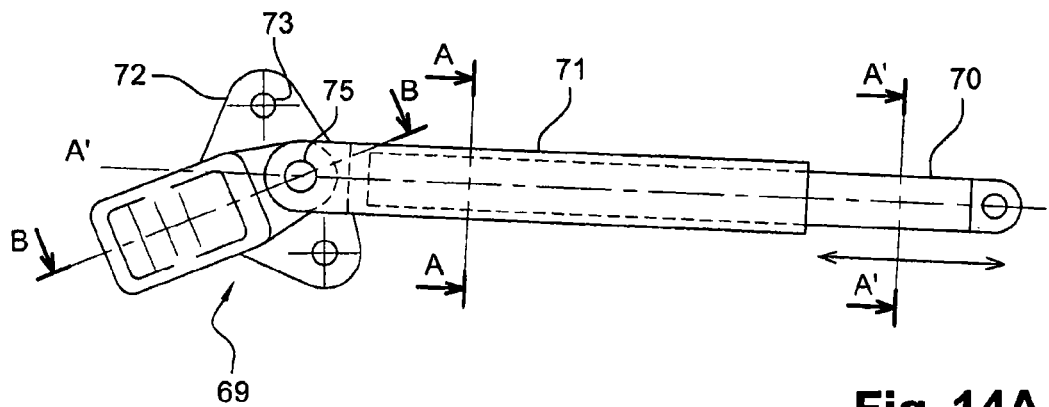
Figure 14B:
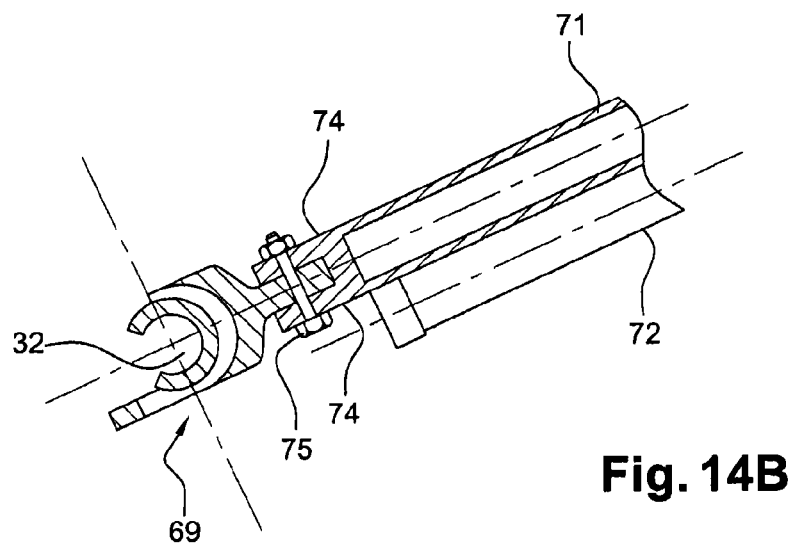
Figure 14C:
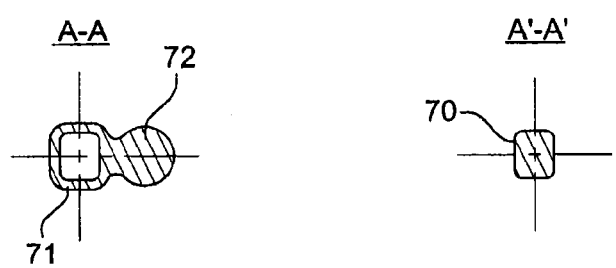
Figure 15:
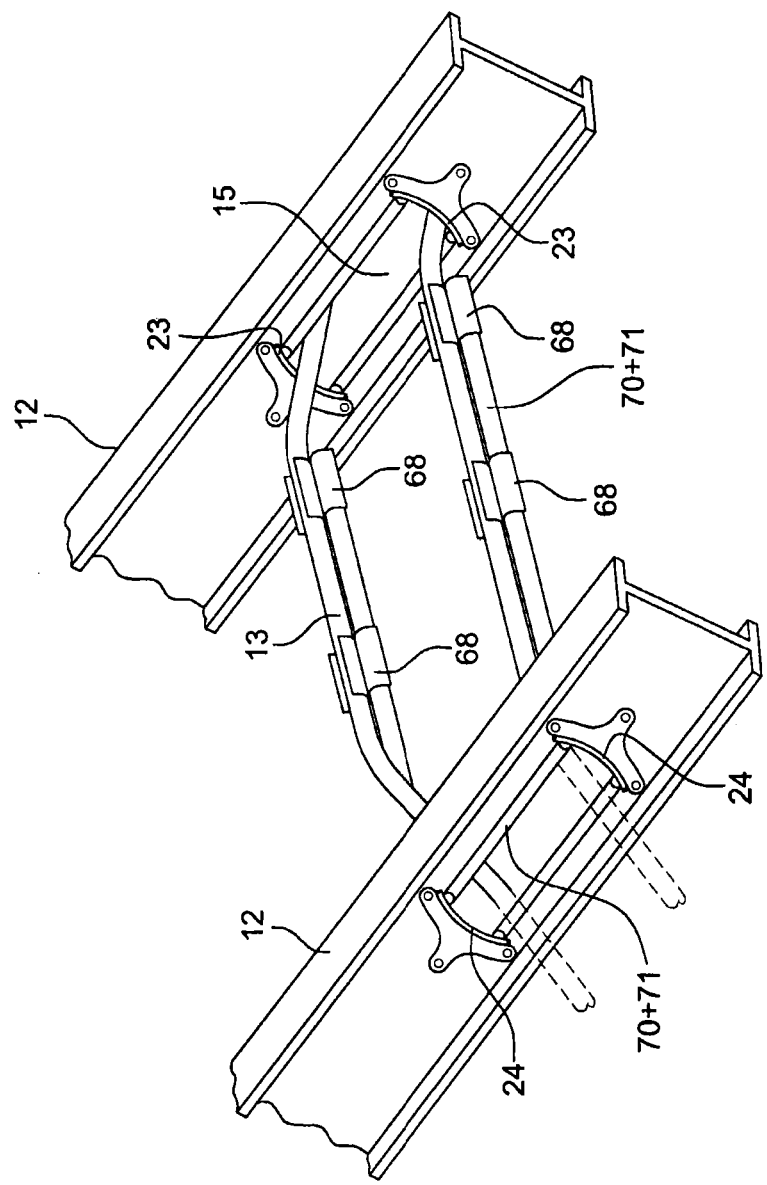

FIGS. 9A, 9B, 9C and 9D measure the different views of an alternative shape of a clip-on module;

FIG. 10 is a view in section of a particular shape of a mounting capable of being fixed to a structure having an L-shaped section;

FIG. 11 is a view in section of an alternative shape of the mounting capable of being fixed to a structure having a T-shaped section;

FIG. 12 shows a view in profile of the mounting bracket of FIG. 11;

FIG. 13 is a schematic view of a particular installation of two mountings according to the second embodiment in an aperture of the structure, the two mountings being connected to each other by an intermediate supporting part;

FIGS. 14A and 14B give a more detailed view of one end of the intermediate supporting part fixed to the clip-on module, and FIG. 14C is a view in section along transect AA and A'A of FIG. 14A;

FIG. 15 shows the two possibilities of the assembly of mountings according to the second embodiment in an aperture of the structure such as a cross-piece or between two cross-pieces.

Figure 1:
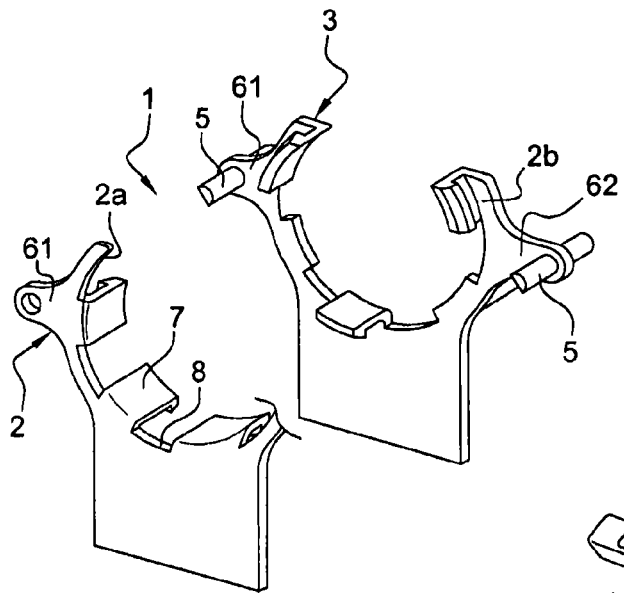
Figure 2A:
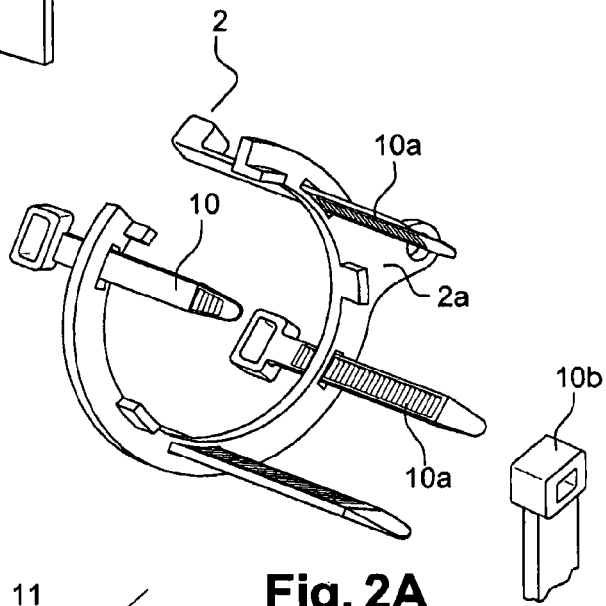
Figure 2B:
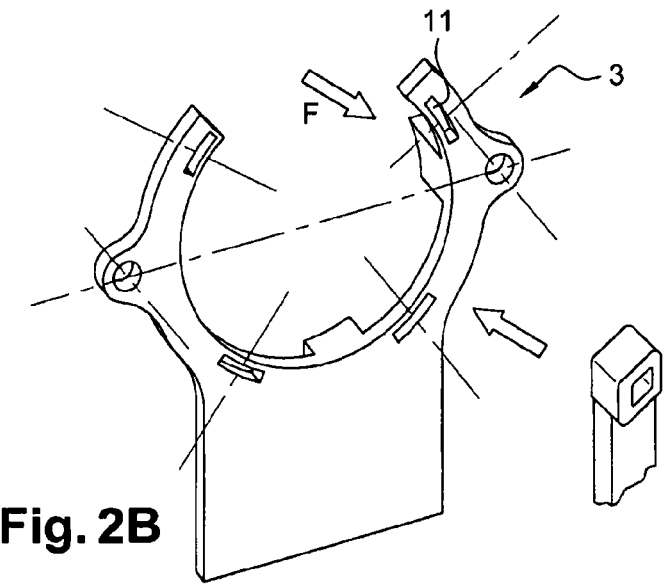

The mounting 1 used to hold the elongate object in position relatively to a structure compliant with the first embodiment of the invention is shown in FIGS. 1, 2A and 2B.

More particularly, FIGS. 1, 2A and 2B show clamping means particularly well suited to the mountings according to the invention. For better visibility of said clamping means, the railings associated with the mountings of the invention have not been shown in this figure. However, the railings as described by means of the other figures, and especially FIGS. 6A and 6B, can easily be transposed to support FIGS. 1, 2A and 2B. Similarly, the clamping means described in association with the mounting of FIG. 1 to FIG. 5B, are easily transposable to the mounting of FIGS. 6A and 6B.

The mounting according to the invention is particularly suited to holding elongate objects such as tubes, sheaths, cables etc. in position. The structure, which is for example a fuselage frame or a floor beam is demarcated by two substantially plane and at least substantially parallel surfaces. An aperture is generally made in the thickness of this structure to make the cables pass through.

The mounting 1 comprises two connecting parts 2, 3 positioned on either side of the structure. The two connecting parts 2, 3 each take the form of cheek plates shaped as half-cradles. Each of said parts 2, 3 comprises a bearing face 2a 3b which bears against a corresponding bearing face of the structure, thus at least partially gripping the rim of the aperture. The two assembled parts thus define an orifice through which the cables pass.

To fulfill the clamping function between the two connecting parts 2, 3, the rim of said two parts 2, 3 is provided with protruding elements 7 and corresponding hollows 8 which cooperate together to block them against the bearing surfaces of the structure.

Each of the two parts 2, 3 comprises two fastening lugs 61, 62 positioned so as to be diametrically opposite each other. These fastening lugs are substantially circular. In the bearing face of one of the parts 3, each of the lugs 61, 62 has a pin 5. The fastening lugs 61, 62 of the second part 2 and of the structure comprise holes 6 to enable the insertion of the pin 5. To lock this pin in the holes, a blocking plug is capable of cooperating with the pin to lock the mounting in position on the structure.

FIGS. 4A, 4B, 5A and 5B illustrate two particular embodiments of this blocking mechanism.

According to a first embodiment (FIGS. 4A and 4B), the pin 5 comprises a groove 17 and the blocking plug 16 has a protruding element 18 of corresponding shape so that this protruding element gets introduced into the groove to ensure the blocking.

According to the second embodiment proposed, the pin 5 has a protruding element 19 and the blocking plug 16 has a corresponding hollow 20 designed to get blocked on said protruding feature 19. To this end, the plug 16 is introduced into the holes 16 in a position in which the hollow 20 is not abutting the protruding element 19, and then the plug 16 is given a 90° rotation so as to be shifted into a blocking position.

The mounting 1 is then kept gripped against the structure by means of the protruding elements 7 and the hollows 8, the blocking means 5, 16 providing for the fastening even when the effects of the vibration make the clamping of the two half-cradles 2, 3 less efficient.

FIGS. 2A and 2B show an alternative structure of the means for clamping the two half-cradles 2, 3 against the structure. Each of said half-cradles 2, 3 has holes 11 made in the peripheral edges. After the fastening of the mounting 1 to the structure by means of tabs 5 and plugs 16, the assembling between the two half-cradles 2, 3 is finished by making clamping means 10 pass through these holes. These clamping means 10 such as a ring enables the two half-cradles 2, 3 to be clamped against each other. Preferably, these clamping means 10 are constituted for example by a collar provided with positions marked 10*a* which cooperate with a blocking element 10*b*. Thus, it is possible to adapt the clamping to the thickness of the structure. Other shapes and means equivalent to the collar as shown can also be used.

The mounting also comprises a bearing part 4 capable of maintaining and fixing the cable or any other elongate object transversally to the lateral surfaces 12*a*, 12*b* of the structure.

Figure 3:
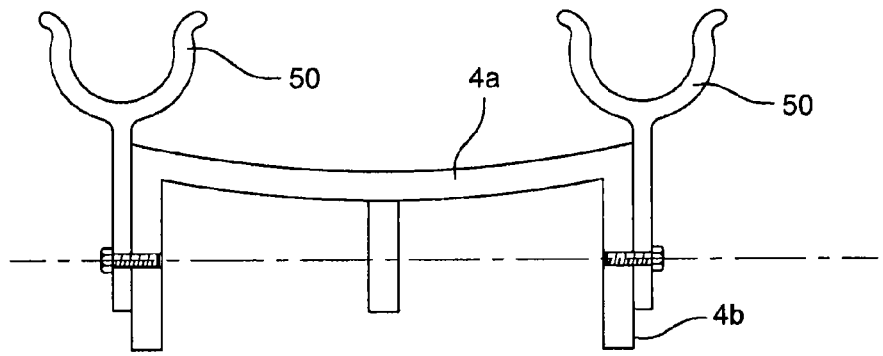
FIG. 3 is a schematic front view of a mounting part.
Figure 4A:
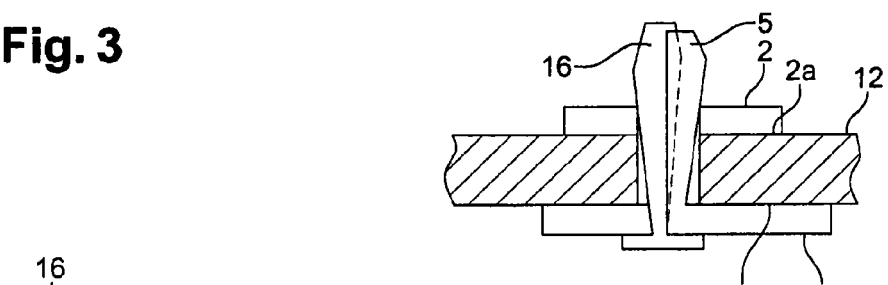
FIGS. 4A and 4B are a schematic view of the shape of the blocking means to block the two connecting parts on the structure.
Figure 4B:
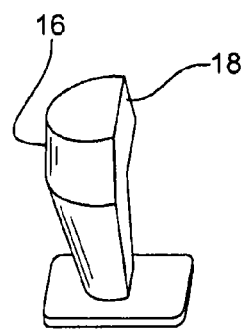
Figure 4B:
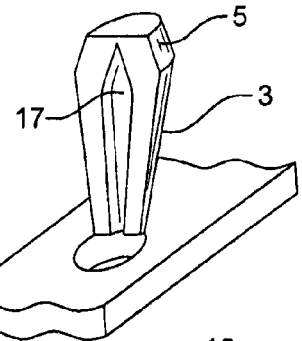
Figure 5A:
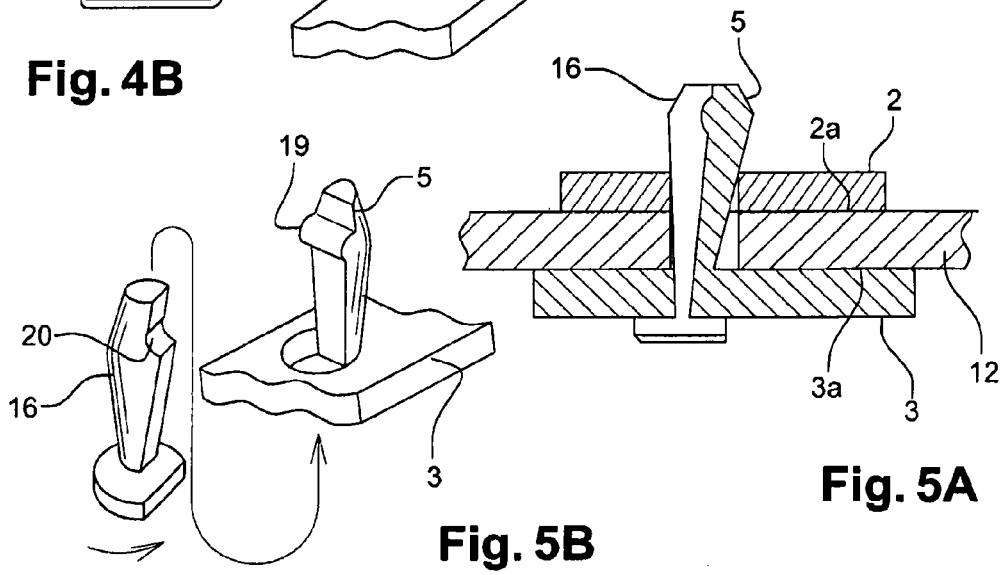
FIGS. 5A and 5B show another embodiment of these blocking means.
Figure 5B:
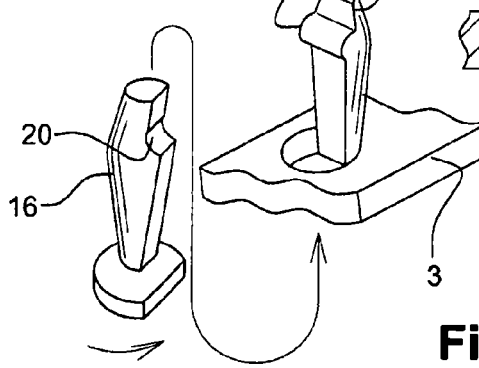

After the fastening of the mounting 1 to the structure, the elongate objects such as the cables are fixed to said mounting 1 by means of holding means 50 such as a clamping collar (FIG. 3).

Figure 6C:
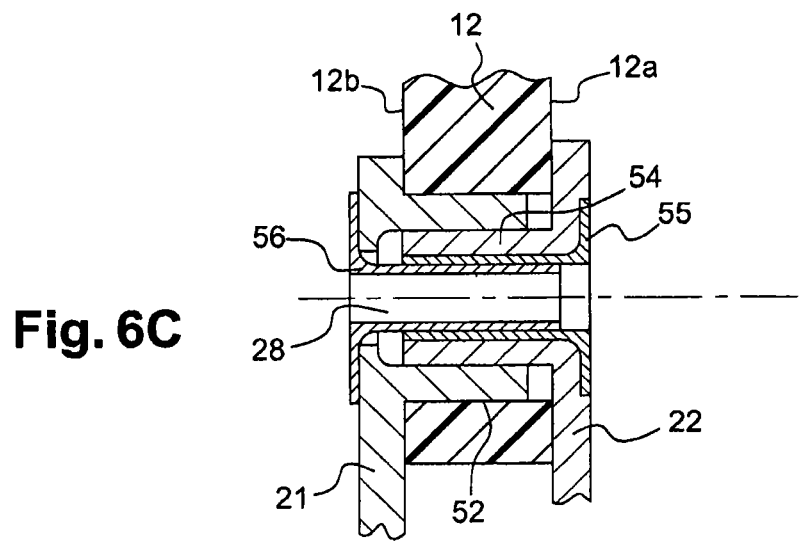
FIG. 6C shows a cross-section of a part of FIG. 6A.
Figure 7:
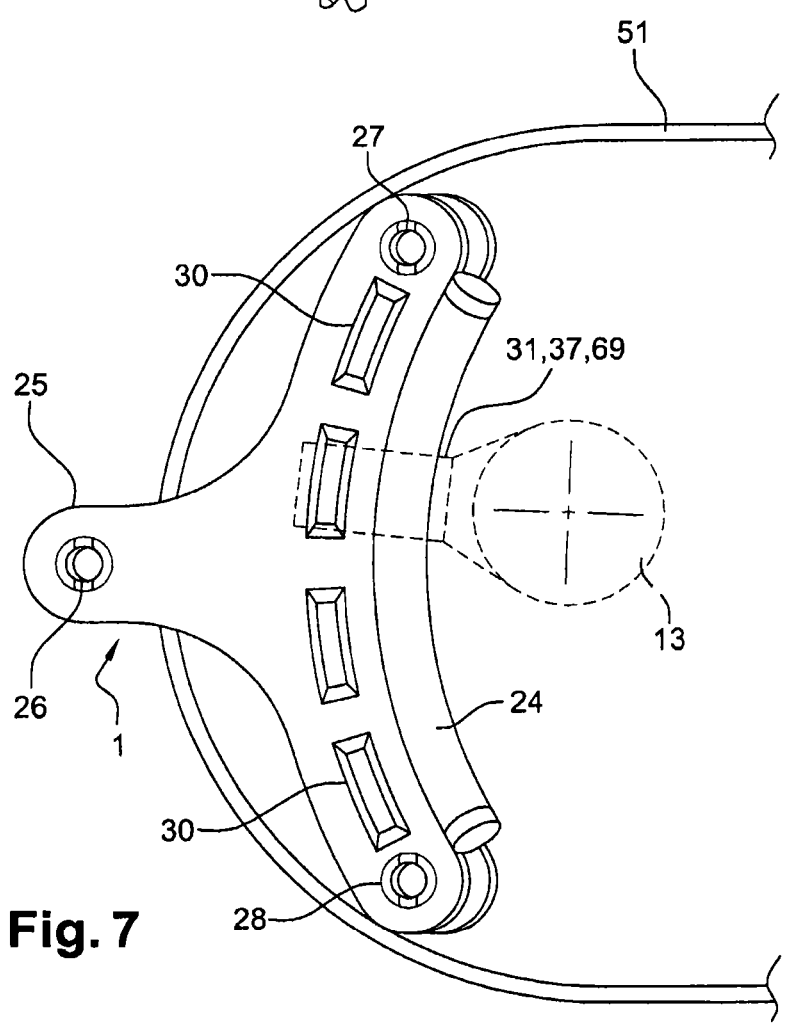
FIG. 7 is a schematic view of the installation of an elongate object on a mounting of the FIG. 6A fixed to a structure.

FIGS. 6A, 6B and 7 illustrate a second embodiment of the invention in which the mounting to keep elongate objects, such as the electrical cables, in position on a structure comprises:

two cheek plates having an identical shape 21, 22, each presenting a bearing face 21*a*, 22*a* to rest on a corresponding bearing surface of the structure 12;

two railings 23, 24 secured to the cheek plates;

holding means or clip-on module 31, 37, 69 capable of holding elongate objects by means of the fastening means such as a ring 36, a collar 44 or a cradle 68.

Naturally, any other holding means and especially those described by means of FIGS. 1, 2A and 2B can be used.

The two cheek plates 21, 22 each comprise a substantially incurvated edge 21*b*, 22*b* and an extension 25, 29. To fix the cheek plates to the structure, a hole 26 is provided for this purpose on the extensions and on the structure to obtain the passage of a conventional clamping means 10 as described in FIG. 2A. Generally, the hole 26 is made on the bisector line of the two bearing points (situated at the two opposite ends of the cheek plates 21, 22) and at a distance proportional to the geometry of the element, so as to not to generate any cracks in the structure.

Besides, as shown in FIG. 6C, each of the cheek plates 21, 22 is provided at its ends with an extension 52 (only one can be seen in FIGS. 6A and 6B) in radial protrusion from the corresponding bearing surface 21*a*, 22*a*. The extensions have for example complementary cylindrical circular shapes so that the extensions of one of the two cheek plates 21, 22 get fitted into the extensions 52 of the second cheek plate 21, 22.

The ends of the cheek plates also comprise a hole 27, 28 designed to receive a conventional clamping means to keep the two cheek plates joined.

In addition, it is also possible, as shown in FIG. 6C, to use additional fastening means to ensure the holding of the two cheek plates 21, 22 relatively to each other and relatively to the wall on which they are fixed. Thus, an enlargement of the extensions 52, 54 of the cheek plates 21, 22 can be seen in cross-section. The two extensions 52 and 54 have a generally hollow cylindrical circular shape. The extension 52 on the cheek plate 21 has a diameter strictly greater than the diameter of the extension 54 on the cheek plate 22 so that the second extension 54 is inserted into the hole of the first extension 52. Moreover, to maintain this mutual fitting, two threaded inserts 55 and 56 are used. More specifically, a first insert 55 is introduced into the orifice of the second extension 54, which is of a smaller diameter, of a first side 12*a* of the wall 12 along which the cheek plate 22 is attached. A second insert 56 is inserted into the orifice 28 of the other side 12*b* of the wall 12, said second insert 56 being screwed into the first insert 55.

FIG. 7 illustrates an example of the fastening of the two cheek plates 21, 22 on the edge 51 of an aperture 15 made in a structure. From the description just given, it will easily be understood that, by their shape, the two cheek plates can also be fixed to the edge of a structure such as the edge of a frame or a floor beam. It is therefore no longer necessary to make an aperture in the structure to make the elongate objects pass through, and there is therefore no longer any diminishing of the mechanical properties of the structure. Furthermore, the routing of the cables is no longer imposed by the structures, and the installation of the cables is made more flexible.

The two parts 23, 24 take the form of a railing having a substantially cylindrical shape with a circular and incurvated section to match the shape of the cheek plates. These railings are fixedly joined to the cheek plates by any conventional means, especially bonding. Naturally, the cylindrical railings can have another section and especially a square, oval or other section. In particular, the section can advantageously have a plane face directed outwards on which? as described here below, modules can be fixed/clipped on and be immobilized in rotation on said railing.

In one exemplary embodiment, as illustrated in FIGS. 6A and 6B, one of the two railings 23 is positioned laterally relatively to the cheek plate and the second railing 24 is laid out on the incurvated edge 21*b* of the cheek plate. In another alternative embodiment, the two railings can both be secured to the incurvated edges 21*b*, 22*b*.

The elongate object 13 is held in position relatively to the railing by means of a clip-on module or holding means 31, 37, 69 (FIG. 7). This clip-on module comprises a first fastening lug 32 configured so as to get clipped onto the railing and a second fastening lug designed to fix the elongate object by means of known fastening means.

FIGS. 8A, 8B, 8C and 8D show the different views of a first embodiment of such a holding means 31 or clip-on module. This module takes the form of a substantially L-shaped section. One end of this L-shape comprises a first fastening log 32 in the shape of a concave open surface designed to get clipped onto the railing. By pressing said concave surface against the wall of the railing, the edges of the concave surface are slightly spread apart until the concave surface gets supported against the wall of the railing, and then the concave surface closes on the railing. The module 31 is then assembled on the railing.

A hole 34 is provided in the vicinity of this concave surface as well as corresponding holes 30 on the lateral wall of the cheek plates to enable the passage of a ring or any other fastening means 36 through a hole 30 on the cheek plate 21, 22, which enable the fastening of the module 31 to the corresponding railing 23, 24 to be consolidated.

The second fastening lug 65 of the clip-on module as illustrated in FIG. 8C takes the form of a fastening part having a substantially circular shape pierced with a hole 33. A collar 44 is fixed by means of a bolt to this fastening lug. This collar is designed to receive the elongate object 13 and hold it within the collar.

This module also has a second fastening lug 66 in the form of a fork comprising a pin 35 connecting two arms 74. The two arms 74 have a recessed part designed to receive, in a resting position, a part of the elongate object. This recessed part has a substantially cylindrical hollow shape to match the external surface of the object to be received. A clamping collar attaches the elongate object to the pin 35. The main axis 53 of the elongate object 13 is then substantially parallel to the pin 35. Thus, these two fastening lugs of the module 31 enable the elongate object to be fixed along two possible directions in combination with the position of the railings 23, 24 relatively to the cheek plates 21, 22.

FIG. 8C illustrates a particular example in which the module 31 is fixed to the railing 23, the railing being itself fixed to the lateral surface of the cheek plate 22. The elongate object 13 is attached to the module in making a collar 44 pass through the hole 33, The main axis 53 of this object is therefore oriented crosswise to the plane of the cheek plates.

FIG. 8D illustrates another example in which the module 31 is fixed to a railing 24, the railing being fixed to the incurvated edge 21b of the cheek plate 21. The axis 53 of the elongate object is substantially parallel to the plane of the cheek plates.

FIGS. 9A, 9B, 9C and 9D show the different views of another embodiment of the holding means 37.

This shape differs from that of the preceding one in that the second fastening lug forms a ball-and-socket link 67 to orient the object in the chosen direction. To this end, this second fastening lug has a substantially circular part 38 provided at its center with a protruding element 40 having a substantially spherical surface. This protruding element 40 cooperates with a spherical concave surface of a mobile fastening element 43 so as to define a ball-and-socket link to orient the elongate object in the chosen direction.

To fix the element 43 to the circular part 38 once the direction in which the elongate object must be held has been chosen, holes 41 are provided on the periphery of said part 38 and the mobile element to make a fastening means 36 pass through. Thus; by means of this ball-and-socket link, it is possible to adjust the orientation of the fastening element 43 at 360° in the plane of the circular part 38.

The elongate object 13 is fixed to the fastening element 43 by means of a cradle 68 having a part that matches the external shape of the element 43 and another recessed part matching the external shape of the elongate object to be received. This recessed part has a recess open at its ends, the recess being designed to receive at least a part of a clamping collar.

Besides, the circular part 38 also has holes 33 to fix a clamping collar 44 by means of a bolt.

In general, the fastening means for fastening the elongate object can be similar to those described in the first embodiment of the clip-on module 31.

FIGS. 10 and 11 represent a variant of an embodiment of the cheek plates in a particular configuration of the structure 12 in which at least one of the bearing surfaces of the structure 12 forms two angled bearing surfaces 12a, 12c.

FIG. 10 shows a structure such as a frame having an L-shaped section. One of the two surfaces is formed by two angled bearing surfaces 12a, 12c. The cheek plate 21 placed on the side of this bearing surface then comprises two faces 21a, 21c connected to each other by a linking arm 48. This arm is configured so that the two surfaces 21a, 21c bear respectively against the two angled bearing surfaces 12a, 12c. More specifically, the bearing face 21c also has an L-shaped section which bears against the bearing surface 12c and the lateral edge of the frame 12. The second cheek plate 22 has a shape similar to that described in the example illustrated in FIGS. 6A and 6B. Thus, the two cheek plates, once assembled, form an angle. The elongate objects 13 held on such a support of this kind are mutually orthogonal. In FIG. 10, the elongate objects 13 are held on the support by holding means or a clip-on module 31 illustrated in FIGS. 8A-8D.

To provide for the assembling, one end of the cheek plates comprises a hole designed to receive a clamping means 10 which also passes into a hole of the structure. The other ends are joined together, also by a similar clamping means.

FIG. 11 illustrates a frame having a T-shaped section. Each of the bearing surfaces 12a, 12b is formed by two angled bearing surfaces. In this case, to form the fastening support, each of the two cheek plates 21, 22 comprises two faces 21a, 22 connected together by a linking arm 48. Once assembled together, the two cheek plates form an angle so that the bearing surfaces 21c, 22c surround the base of the T-shaped frame.

The railings 23, 24 are respectively secured to the side wall of these cheek plates. It is also possible that one of the two railings 24' will be secured to the incurvated edge of one of the two cheek plates as illustrated in FIG. 12.

FIGS. 13 and 14 illustrate a third, particularly advantageous shape of the clip-on module 69 implemented in the mounting according to the second embodiment.

FIG. 13 shows two mountings assembled so as to be facing each other in the aperture 15 of the structure 12. An assembly of two intermediate supporting parts 70, 71 is laid out in the aperture between the two supports, the main axis of this assembly being oriented in parallel to one of the axes 75 of the structure. The ends of these two supporting parts 70, 71 are fixed to the railings 24 of the two facing supports by means of a clip-on module 69.

The two parts 70, 71 are mounted sliding relative to each other to adjust the length of the assembly as a function of the size of the aperture. Besides this telescopic layout can enable absorption of the relative motions of the structures along which said parts 70, 71 extend in relation to each other. A view in section of these two parts is shown in FIG. 14C. This assembly of telescopic, intermediate supporting parts 70, 71 advantageously makes it possible to keep in position several elongate objects 13 spaced out from one another by a certain distance by means of a cradle 68. It is very easy to adjust this distance by simply shifting the cradle 68.

FIG. 14A gives a more detailed view of one of the two clip-on modules 69 to which one end of the assembly of intermediate supporting parts 70, 71 is fixed. More specifically, the clip-on module 69 comprises a first fastening lug 32 that can get clipped on to the railing 24 of the support as in the other two embodiments of the clip-on module and a second fastening lug 72 to which one end of the assembly 70, 71 is fixed.

A view in section of the module 69 along the axis B-B at the level of the second fastening lug 72 is shown in FIG. 14B. This second fastening lug 72 is provided with fastening holes 73. The end of the intermediate part 71 takes the form of a fork joint comprising two arms 74. A known fastening means, such as a screw/nut or peg attachment 75, connects the second fastening lug 72 to the arms 74. Holes in the second fastening lug in the arms enable the passage of the peg or of the screw. The other end of the assembly 70, 71 not illustrated in FIG. 14B, is fixed similarly to the clip-on module 69 of the second mounting.

FIG. 14B also shows an example of an intermediate supporting part which comprises a female railing 72 secured to a male railing 71 which is one of the two intermediate supporting parts. The ends of the male railing are fixed to the second fastening lug of the clip-on module 69 by the fastening means described here above. FIG. 14C, representing a view in section along the axis AA of this intermediate supporting part 71, shows that the female railing 72 takes the form of a circular-sectioned cylinder. The cradle 68 designed to fix the elongate part to the railing comprises a part capable of getting clipped on to the railing 72 and another part which receives a part of the elongate object in a resting position. A clamping collar ties the assembly.

FIG. 15 illustrates the two forms of mounting of the supports as described in FIGS. 14A and 14B relatively to the cross-pieces 12. According to a first form of mounting as illustrated also in FIG. 13, the mountings can be mounted to be facing each other in the aperture 15 of a cross-piece 12 to hold in position the passage of an electrical cable 13 for example through the aperture (FIG. 13). In this case, the clip-on modules 69 are mounted on the railings 24 which are laid out on the incurvated edge of the two cheek plates so that the clip-on modules are positioned to be facing each other to receive the ends of the assembly of the two intermediate supporting parts 70, 71. The sliding of the part 70 in the part 71 makes it possible to adapt the length of the assembly 70+71 to the size of the aperture 15.

FIG. 15 also shows a second form of mounting in which the clip-on modules 69 are mounted on the railings 23 which are laid out laterally relatively to the cheek plate so that the two clip-on modules 69 are positioned so as to be facing each other between two cross-pieces 12. The assembly 70+71 is fixed to these two modules 69 between the two cross-pieces 12. This second form of mounting, called longitudinal mounting, makes it possible to hold in position the passage of an electric cable 13 from one cross-piece to the other by means of the cradles 68 clipped on to the female railings 72. In this second form, the sliding of the part 70 in the part 71 makes it possible to carry out adjustments of length as a function of the distance between the two cross-pieces 12, and absorb the relative motions of said cross-pieces 12.

The invention claimed is:

1. A mounting for holding an elongate object such as an electrical cable in position relatively to a structure, said mounting comprising:
   two connecting parts connecting the mounting to the structure, each of the two connecting parts has a bearing face contacting respective bearing surfaces of the structure, said two connecting parts being assembled with each other by clamping means, the two connecting parts taking a form of a pair of cheek plates, said cheek plates each comprising one edge having a substantially incurvated shape and one edge prolonged by an extension;
   at least one supporting part capable of holding said elongate object by holding means,
   wherein said at least one supporting part takes a form of a incurvated railing substantially similar to a respective incurvated edge of one of the pair of cheek plates,
   wherein the supporting part has a substantially cylindrical body and is secured to a connecting part, and
   wherein said bearing surfaces of the structure are substantially plane, at least one aperture being prepared in the structure through the bearing surfaces to let said elongate object to pass through.

2. The mounting according to claim 1, wherein said two connecting parts are configured so as to at least partially clamp a rim of the aperture.

3. The mounting according to claim 1, wherein each of the at least one supporting part incurvated railing is positioned adjacent to a respective incurvated edge of the pair of cheek plates.

4. The mounting according to claim 1, wherein the at least one supporting part incurvated railing is secured along one of the incurvated edges of the pair of cheek plates, and the at least one supporting part incurvated railing is secured at a position laterally adjacent to one of the incurvated edges of the pair of cheek plates.

5. A mounting for holding an elongate object such as an electrical cable in position relatively to a structure, said mounting comprising:
   two connecting parts for connecting the mounting to the structure, each of the two connecting parts has a bearing face to contact a respective bearing surface of the structure, said two connecting parts being assembled with each other by clamping means, the two connecting parts taking a form of a pair of cheek plates, said cheek plates each comprising one edge having a substantially incurvated shape and one edge prolonged by an extension;
   at least one supporting part capable of holding said elongate object by holding means,
   wherein said at least one supporting part takes a form of a incurvated railing substantially similar to a respective incurvated edge of one of the pair of cheek plates,
   wherein the supporting part has a substantially cylindrical body and is secured to a connecting part, and
   wherein the holding means take a form of a clip-on module comprising a first fastening lug configured so as to get clipped onto said at least one incurvated railing and at least one second fastening lug designed to attach the elongate object by fastening means.

6. The mounting according to claim 5, wherein each of the at least one incurvated railing is secured along a respective one of the incurvated edges of the pair of cheek plates.

\* \* \* \* \*